US010798370B2

(12) United States Patent
Zhang et al.

(10) Patent No.: US 10,798,370 B2
(45) Date of Patent: Oct. 6, 2020

(54) APPARATUS, SYSTEM, AND METHOD FOR INTERPUPILLARY-DISTANCE-ADJUSTABLE HEAD-MOUNTED DISPLAYS

(71) Applicant: FACEBOOK TECHNOLOGIES, LLC, Menlo Park, CA (US)

(72) Inventors: Rui Zhang, Redwood City, CA (US); Michael Xingyi Yu, Mountain View, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 175 days.

(21) Appl. No.: 15/691,443

(22) Filed: Aug. 30, 2017

(65) Prior Publication Data

US 2019/0068944 A1 Feb. 28, 2019

(51) Int. Cl.
| | |
|---|---|
| *H04N 13/388* | (2018.01) |
| *H04N 13/327* | (2018.01) |
| *H04N 13/344* | (2018.01) |
| *G02B 27/01* | (2006.01) |

(52) U.S. Cl.
CPC ......... *H04N 13/327* (2018.05); *G02B 27/017* (2013.01); *H04N 13/344* (2018.05); *H04N 2213/001* (2013.01); *H04N 2213/002* (2013.01)

(58) Field of Classification Search
CPC combination set(s) only.
See application file for complete search history.

(56) References Cited

U.S. PATENT DOCUMENTS

| | | |
|---|---|---|
| 5,347,400 A | 9/1994 | Hunter |
| 5,739,893 A | 4/1998 | Karasawa et al. |
| 6,538,624 B1 | 3/2003 | Karasawa et al. |

(Continued)

FOREIGN PATENT DOCUMENTS

| | | | | |
|---|---|---|---|---|
| EP | 0 883 012 A2 | * | 12/1998 | ............. G02B 27/01 |
| EP | 0883012 A2 | * | 12/1998 | ......... G02B 27/0176 |

(Continued)

OTHER PUBLICATIONS

Peter Wesley Bristol et al.; Apparatus, System, and Method for Adjusting Head-Mounted-Display Straps; U.S. Appl. No. 15/582,566, filed Apr. 28, 2017.

(Continued)

*Primary Examiner* — Zhubing Ren
(74) *Attorney, Agent, or Firm* — FisherBroyles, LLP

(57) ABSTRACT

An apparatus for head-mounted displays may include (i) a flexible planar support frame, (ii) a left eye cup coupled to a left side of the flexible planar support frame and a right eye cup coupled to a right side of the flexible planar support frame, (iii) left-eye and right-eye display screen areas mounted to the flexible planar support frame such that the left-eye display screen area projects toward a left eye aperture defined by the left eye cup and the right-eye display screen area projects toward a right eye aperture defined by the right eye cup. The flexible planar support frame may be bendable such that the distance between projections of the left-eye and right-eye display screen areas onto a viewing plane varies as the flexible planar support frame bends, thereby adjusting for varying interpupillary distances. Various other devices, systems, and methods are also disclosed.

20 Claims, 11 Drawing Sheets

(56) References Cited

U.S. PATENT DOCUMENTS

| | | |
|---|---|---|
| 9,759,921 B2 | 9/2017 | Kinoshita |
| 2004/0070825 A1 | 4/2004 | Charlesworth |
| 2015/0138645 A1* | 5/2015 | Yoo .................... G02B 27/0101 |
| | | 359/630 |
| 2015/0219902 A1* | 8/2015 | Kim ................... G02B 27/0179 |
| | | 345/8 |
| 2015/0323792 A1* | 11/2015 | Kinoshita .......... G02B 27/0176 |
| | | 345/8 |
| 2016/0012643 A1* | 1/2016 | Kezele ................ H04N 13/156 |
| | | 345/633 |

FOREIGN PATENT DOCUMENTS

| | | |
|---|---|---|
| EP | 0 883 012 B1 | 3/2004 |
| JP | 3956296 B2 | 8/2007 |
| JP | 2015-213271 A | 11/2015 |
| KR | 10-2017-0082394 A | 7/2017 |
| WO | 02/059681 A1 | 8/2002 |
| WO | 2017/119788 A1 | 7/2017 |

OTHER PUBLICATIONS

Rui Zhang; Apparatus, System, and Method for Image Normalization for Adjustable Head-Mounted Displays; U.S. Appl. No. 15/708,095, filed Sep. 18, 2017.

International Search Report and Written Opinion received for International Patent Application Serial No. PCT/US2018/048178 dated Dec. 18, 2018, 16 pages.

\* cited by examiner

APPARATUS, SYSTEM, AND METHOD FOR INTERPUPILLARY-DISTANCE-ADJUSTABLE HEAD-MOUNTED DISPLAYS

BACKGROUND

Putting on a virtual reality headset may be the beginning of a thrilling experience, one that may be more immersive than almost any other digital entertainment or simulation experience available today. Virtual reality headsets may enable users to travel through space and time, interact with friends in a three-dimensional world, or play video games in a radically redefined way. Virtual reality headsets may also be used for purposes other than recreation—governments may use them for military training simulations, doctors may use them to practice surgery, and engineers may use there as visualization aids.

In any use of a virtual reality headset, making the experience as immersive as possible may be critical. Regrettably, a variety of factors may disrupt virtual-reality immersion, and one of the most significant disruptions to having an immersive experience may be a poorly-calibrated headset. For example, if the spacing between viewing lenses does not match the distance between a user's pupils, the user may experience eye strain, blurred vision, and/or facial discomfort.

Traditional virtual reality headsets may provide some limited options for addressing a poor calibration but these options may be sub-optimal. For example, traditional adjustment mechanisms may involve widening an assembly, which may constrain attempts to design a headset with a small form factor. In addition, traditional adjustment mechanisms may involve many moving parts, potentially increasing manufacturing costs while also increasing the number of mechanical failure points. Some traditional adjustment mechanisms may provide a poor or uncomfortable fit for some users. In addition, some traditional adjustment mechanisms may interfere with proper viewing (e.g., because eye pieces may move apart while display screens stay in place).

SUMMARY

The disclosure provided herein describes and illustrates various apparatuses, systems, and methods for head-mounted displays that are adjustable for differing interpupillary distances. As will be explained in greater detail below, an adjustment mechanism may angle display areas either inward (to point toward close-set eyes) or outward (to point toward wide-set eyes) by bending a flexible support frame within which the display areas are embedded.

In some examples, an apparatus for interpupillary-distance-adjustable head-mounted displays may include a flexible planar support frame. The apparatus may also include a left eye cup coupled to a left side of the flexible planar support frame and a right eye cup coupled to a right side of the flexible planar support frame. The apparatus may additionally include a left-eye display screen area mounted to the flexible planar support frame such that the left-eye display screen area projects toward a left eye aperture defined by the left eye cup. Likewise, the apparatus may include a right-eye display screen area mounted to the flexible planar support frame such that the right-eye display screen area projects to a right eye aperture defined by the right eye cup. In these examples, the flexible planar support frame may be bendable such that the distance between a projection of the left-eye display screen area and a projection of the right-eye display screen area onto a viewing plane varies as the flexible planar support frame bends, thereby adjusting for varying interpupillary distances.

For example, the flexible planar support frame may be bendable toward a user's face such that the distance between the projection of the left-eye display screen area and the projection of the right-eye display screen area decreases, thereby adjusting for a reduced interpupillary distance.

In another example, the flexible planar support frame may be bendable away from a user's face such that the distance between the projection of the left-eye display screen area and the projection of the right-eye display screen area increases, thereby adjusting for a wider interpupillary distance.

In some examples, the left-eye display screen area and the right-eye display screen area may be separate display screens that angle toward each other as the flexible planar support frame bends toward a user's face and that angle away from each other as the flexible planar support frame bends away from the user's face. Alternatively, the left-eye display screen area and the right-eye display screen area may include areas of an integral display screen that uses a flexible display material, allowing the integral display screen to bend as the flexible planar support frame bends.

The apparatus may also include an actuator that controls a degree to which the flexible planar support frame bends. For example, the actuator may include a dial and a translating element that translates rotation of the dial into linear movement of a bending element. The bending element may be coupled to the flexible planar support frame and bend the flexible planar support frame via linear movement.

In some examples, the apparatus may further include a rigid holding element that is coupled to the flexible planar support frame at a center position between the left-eye display screen area and the right-eye display screen area. In these examples, the flexible planar support frame may bend around the rigid holding element. The apparatus may additionally include a pair of lenses coupled to the left eye cup and the right eye cup.

According to some examples, the apparatus may include a sensor that detects and transmits a signal describing an extent to which the flexible planar support frame is bent to a compensation module. The compensation module may adjust images displayed by the left-eye display screen area and the right-eye display screen area based at least in part on the signal to normalize a projection of the images to a user's eyes to correct for apparent distortion caused by moving the left-eye display screen area and right-eye display screen area relative to the user's eyes.

A corresponding system for interpupillary-distance-adjustable head-mounted displays may include a flexible planar support frame. The system may also include a left eye cup coupled to a left side of the flexible planar support frame and a right eye cup coupled to a right side of the flexible planar support frame. The system may additionally include a left-eye display screen area mounted to the flexible planar support frame such that the left-eye display screen area projects toward a left eye aperture defined by the left eye cup. Likewise, the system may include a right-eye display screen area mounted to the flexible planar support frame such that the right-eye display screen area projects to a right eye aperture defined by the right eye cup. In these examples, the flexible planar support frame may be bendable such that the distance between a projection of the left-eye display screen area and a projection of the right-eye display screen area onto a viewing plane varies as the flexible planar support frame bends, thereby adjusting for varying interpupillary distances. The system may also include a head mount coupled to the adjustable display apparatus that, when worn by a user, holds the adjustable display apparatus to the user's face such that the left-eye display screen area projects to the user's left eye and the right-eye display screen area projects to the user's right eye.

As an example, the flexible planar support frame may be bendable toward a user's face such that the distance between the projection of the left-eye display screen area and the projection of the right-eye display screen area decreases, thereby adjusting for a reduced interpupillary distance.

In another example, the flexible planar support frame may be bendable away from a user's face such that the distance between the projection of the left-eye display screen area and the projection of the right-eye display screen area increases, thereby adjusting for an increased interpupillary distance.

In some examples, the left-eye display screen area and the right-eye display screen area may be separate display screens that angle toward each other as the flexible planar support frame bends toward a user's face and that angle away from each other as the flexible planar support frame bends away from the user's face. Alternatively, the left-eye display screen area and the right-eye display screen area may include areas of an integral display screen that uses a flexible display material, allowing the integral display screen to bend as the flexible planar support frame bends.

The system may also include an actuator that controls a degree to which the flexible planar support frame bends. For example, the actuator may include a dial and a translating element that translates rotation of the dial into linear movement of a bending element. The bending element may be coupled to the flexible planar support frame and bend the flexible planar support frame via linear movement.

In some examples, the system may further include a rigid holding element that is coupled to the flexible planar support frame at a center position between the left-eye display screen area and the right-eye display screen area. In these examples, the flexible planar support frame may bend around the rigid holding element. The rigid holding element may also be coupled to the head mount, thereby indirectly coupling the flexible planar support frame to the head mount.

In addition to the various systems and devices described herein, the instant disclosure presents exemplary methods associated with interpupillary-distance-adjustable head-mounted displays. For example, a method may include coupling, to a flexible planar support frame, a left eye cup at a left side of the flexible planar support frame and a right eye cup at a right side of the flexible planar support frame. The method may also include mounting, to the flexible planar support frame, a left-eye display screen area, such that the left-eye display screen area projects toward a left eye aperture defined by the left eye cup, and a right-eye display screen area, such that the right-eye display screen area projects toward a right eye aperture defined by the right eye cup. The flexible planar support frame may be bendable such that a distance between a projection of the left-eye display screen area and a projection of the right-eye display screen area onto a viewing plane varies as the flexible planar support frame bends, thereby adjusting for varying interpupillary distances.

The method may also include coupling a head mount to an adjustable display apparatus such that, when the head mount is worn by a user, the head mount holds the adjustable display apparatus to the user's face such that the left-eye display screen area projects to the user's left eye and the right-eye display screen area projects to the user's right eye.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
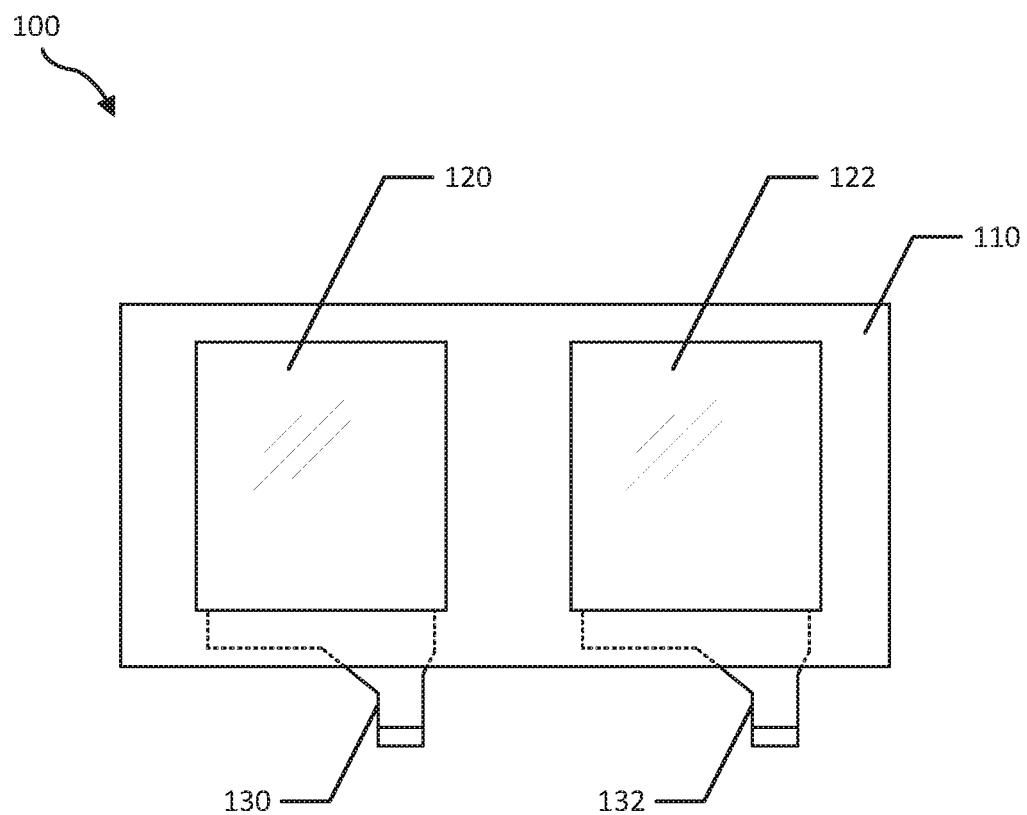
FIG. 1 is a front view of a flexible display.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatuses, systems, and methods for head-mounted displays that are adjustable for differing interpupillary distances. As will be explained in greater detail below, an adjustment mechanism may angle display areas either inward (to point toward close-set eyes) or outward (to point toward wide-set eyes) by bending a flexible support frame within which the display areas are embedded. By adjusting for interpupillary distance via deflection of display areas (rather than, e.g., laterally sliding eye pieces together or apart along a fixed track), the systems discussed may allow for head-mounted displays with reduced form factors (e.g., because adjusting for wide-set eyes may not require creating a wide display assembly). In addition, in some examples the adjustment mechanisms described herein may require relatively few moving parts, thereby potentially decreasing manufacturing costs while also decreasing the number of mechanical failure points. In some examples, the systems described herein may provide a more comfortable fit for a wider variety of users. Additionally or alternatively, the systems described herein may accommodate a wider range of interpupillary distances (e.g., very wide-set eyes and/or very close-set eyes) than traditional headsets. As discussed in greater detail below, these and other disclosed embodiments, whether used alone or in combination, may help optimize the immersiveness, enjoyability, and/or utility of a virtual- or augmented-reality experience.

Figure 2:
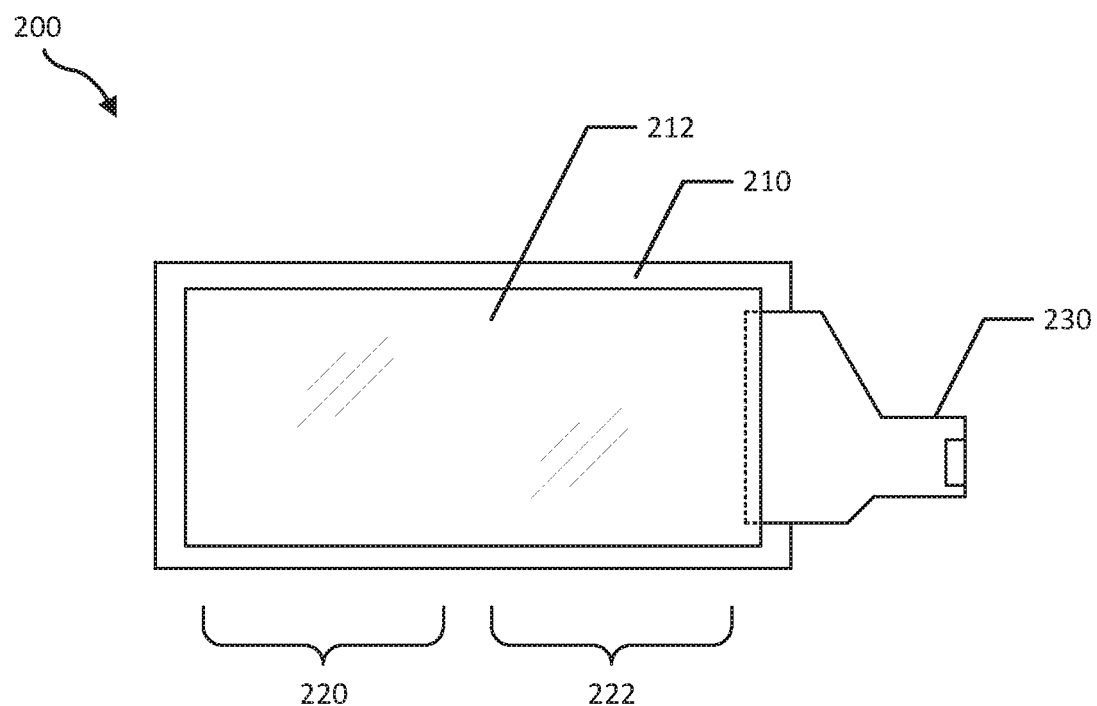
FIG. 2 is a front view of another flexible display.

The following will provide, with reference to FIGS. 1-2, examples of displays that may be adjustable for differing interpupillary distances. In addition, the discussion associated with FIGS. 3-6 will provide examples of an apparatus that may include displays such as the displays illustrated in FIGS. 1-2. Furthermore, the discussion corresponding to FIGS. 7-10 will provide examples of a head-mounted display system that includes an adjustable display apparatus, such as that illustrated in FIGS. 3-6. Finally, the discussion associated with FIG. 11 will provide examples of methods for manufacturing, assembling, configuring, and/or using the interpupillary distance adjustment mechanisms presented herein.

FIG. 1 illustrates a flexible display 100. As shown in FIG. 1, flexible display 100 may include a flexible planar support frame 110. Flexible display 100 may also include a display screen 120 and a display screen 122 mounted to support frame 110. Flexible display 100 may also include a connector 130 for display screen 120 and a connector 132 for display screen 122.

Support frame 110 may be constructed with any suitable material to enable support frame 110 to bend at a vertical axis running between display screens 120 and 122. For example, support frame 110 may be constructed with any flexible rubber polymer, metal, and/or composite material. In some examples, all of support frame 110 may be flexible. In some examples, portions of support frame 110 may be flexible while other portions may be rigid. For example, portions of support frame 110 between display screens 120 and 122 may be flexible while other portions of support frame 110 may be flexible or rigid.

Display screens 120 and 122 may include any suitable type of display screen. In some examples, display screens 120 and 122 may be rigid and/or based on rigid substrates. For example, display screens 120 and 122 may include liquid crystal displays (LCDs) or organic light emitting diode (OLED) displays with rigid substrates. In these examples, as support frame 110 bends, display screens 120 and 122 may rotate (e.g., around the axis at which support frame 110 bends) inward or outward, but remain unbent. In some examples, display screens 120 and 122 may be flexible and/or based on flexible substrates. For example, display screens 120 and 122 may include OLED displays with flexible substrates. In these examples, display screens 120 and 122 may bend as support frame 110 bends. Whether display screens 120 and 122 are flexible or rigid, as support frame 110 bends, the normal lines to the surfaces of display screens 120 and 122 may point inward (when support frame 110 bends inward) or outward (when support frame 110 bends outward). In some examples, display screen 120 may display images designated for a left eye and display screen 122 may display images designated for a right eye. In some examples, display 100 may be reorientable such that display screen 122 is to a user's left side and display screen 120 is to the user's right side. In these examples, the systems described herein may designate display screen 122 as a left-eye display and display screen 120 as a right-eye display (while also, e.g., reorienting images displayed within display screens 120 and 122 so that the images do not appear to be top-bottom or left-right inverted).

Connectors 130 and 132 may include any suitable type of connector for transmitting power and/or data to display screens 120 and 122. For example, connectors 130 and 132 may represent ribbon cables that provide power and data to display screens 120 and 122. In some examples, connectors 130 and 132 may connect display screens 120 and 122 to one or more display subsystems and/or power supplies. In some examples, connectors 130 and 132 may include flexible material and may be dimensioned to provide sufficient slack to maintain connections as display screens 120 and 122 move when support frame 110 bends.

FIG. 2 illustrates a flexible display 200. As shown in FIG. 2, flexible display 200 may include a flexible planar support frame 210. Flexible display 200 may also include a display screen 212 mounted to support frame 210. Display screen 212 may include a display screen area 220 and a display screen area 222. Flexible display 200 may also include a connector 230 for display screen 212.

Support frame 210 may be constructed with any suitable material to enable support frame 210 to bend at a vertical axis dividing display screen 212 approximately in half, running between display screen areas 220 and 222. For example, support frame 210 may be constructed with any flexible rubber, polymer, metal, and/or composite material. In some examples, all of support frame 210 may be flexible. In some examples, portions of support frame 210 may be flexible while other portions may be rigid. For example, portions of support frame 210 between display screens areas 220 and 222 and/or substantially near the horizontal center of support frame 210 may be flexible while other portions of support frame 210 may be flexible or rigid.

Display screen 212 may include any suitable type of display screen. In some examples, display screen 212 may be flexible and/or based on a flexible substrate. For example, display screen 212 may include a single OLED display with a flexible substrate. Accordingly, display screen 212 may bend as support frame 210 bends. As support frame 210 bends, the normal lines to the surfaces of display screen areas 220 and 222 may point inward (when support frame 210 bends inward) or outward (when support frame 210 bends outward). In some examples, display screen area 220 may display images designated for a left eye and display screen area 222 may display images designated for a right eye. In some examples, display 200 may be reorientable such that display screen area 222 is to a user's left side and display screen area 220 is to the user's right side. In these examples, the systems described herein may designate display screen area 222 as a left-eye display area and display screen area 220 as a right-eye display area (while also, e.g., reorienting images displayed within display screen areas 220 and 222 so that the images do not appear to be top-bottom or left-right inverted).

As may be appreciated, by using a display with a flexible substrate, the systems described herein may include display screen areas 220 and 222 in a single, integral display screen while still allowing display screen areas 220 and 222 to angle inward and/or outward relative to each other. In some examples, use of a single, integral display screen may reduce manufacturing costs, reduce design constraints, avoid duplicative parts and/or connections, and/or reduce points of failure in a head-mounted display system.

Connector 230 may include any suitable type of connector for transmitting power and/or data to display screen 212. For example, connector 230 may represent a ribbon cable that provides power and data to display screen 212. In some examples, connector 230 may connect display screen 212 to a display subsystem and/or power supply. In some examples, connector 230 may include flexible material and may be dimensioned to provide sufficient slack to maintain connections as display screen 212 moves when support frame 210 bends.

Figure 3:
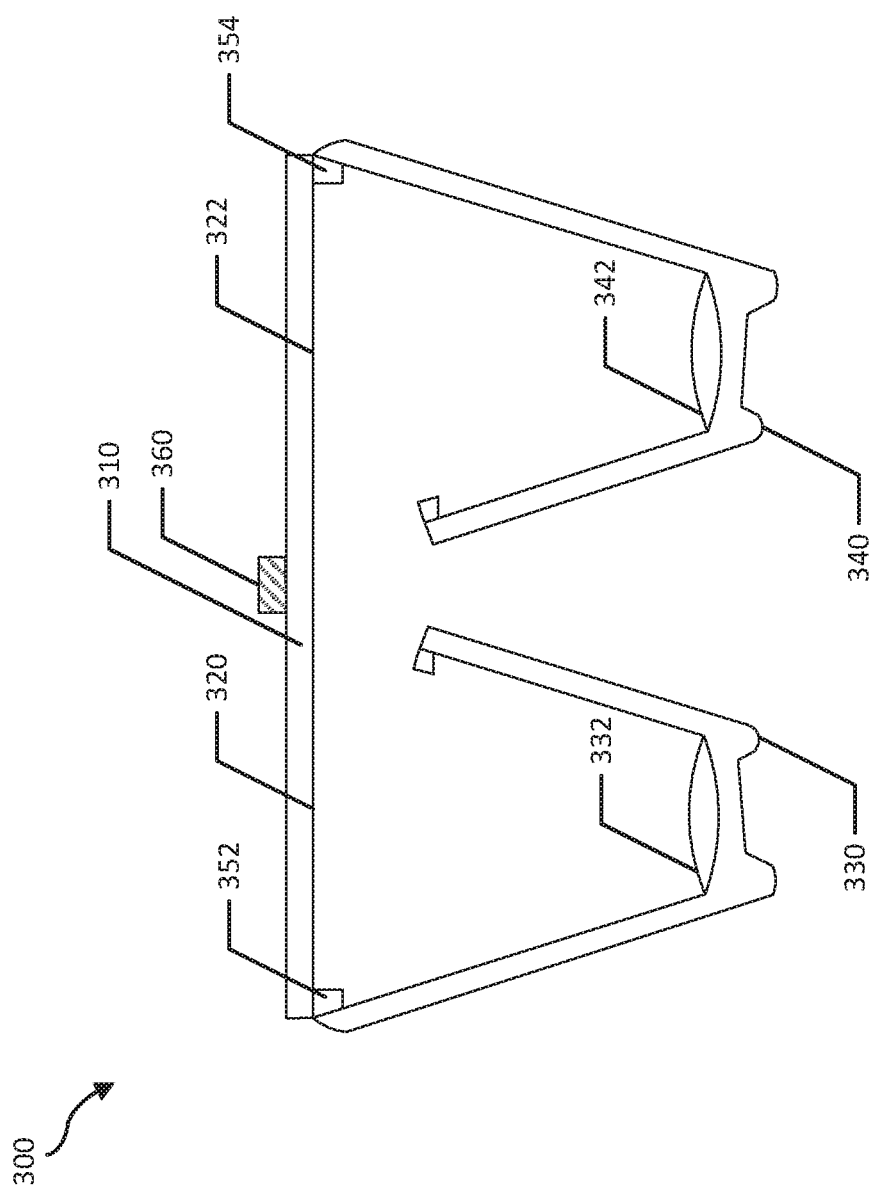
FIG. 3 is a top view of a flexible display apparatus.

FIG. 3 illustrates a flexible display apparatus 300. As shown in FIG. 3, display apparatus 300 may include a flexible display 310. Flexible display 310 may include a left-eye display screen area 320 and a right-eye display screen area 322. Display apparatus 300 may also include a left eye cup 330 and a right eye cup 340. Display apparatus 300 may further include a lens 332 coupled to left eye cup 330 and a lens 342 coupled to right eye cup 340. Display apparatus 300 may additionally include a fastener 352 that couples left eye cup 330 to flexible display 310 and a fastener 354 that couples right eye cup 340 to display 310. Additionally, display apparatus 300 may include a rigid holding element 360 coupled to display 310.

Flexible display 310 may represent any suitable display. For example, flexible display 310 may represent display 100 shown in FIG. 1 or display 200 shown in FIG. 2. Accordingly, in some examples (e.g., where display 310 represents display 100), left-eye display screen area 320 and right-eye display screen area 322 may represent separate display screens (e.g., display screen 120 and display screen 122). In some examples (e.g., where display 310 represents display 200), left-eye display screen area 320 and right-eye display screen area 322 may represent two distinct areas within the same display screen (e.g., areas 220 and 222 within display screen 212). Generally, flexible display 310 may represent any type of display that includes a flexible planar support frame with two display screen areas (e.g., a left-eye area and a right-eye area).

As shown in FIG. 3, eye cups 330 and 340 may hold lenses 332 and 342, respectively. Thus, lens 332 may transmit images displayed in display screen area 320 to a user's left eye and lens 342 may transmit ages displayed in display screen area 322 to a user's right eye. Eye cups 330 and 340 may be coupled to display 310 in any suitable manner. For example, fasteners 352 and 354 may represent clips that rigidly couple eye cups 330 and 340 to display 310 (such that when display 310 bends and display screen areas 320 and 322 rotate, eye cups 330 and 340 with lenses 332 and 342 also rotate). In some examples, lenses 332 and 342 may be shaped (or otherwise adapted) to focus projections from display screen areas 320 and 322.

Rigid holding element 360 may represent any material rigidly coupled to display 310. In some examples, rigid holding element 360 may stay in place as display 310 bends. Thus, the center of display 310 may remain in place as the edges of display 310 bend toward or away from a user's face.

Figure 4:
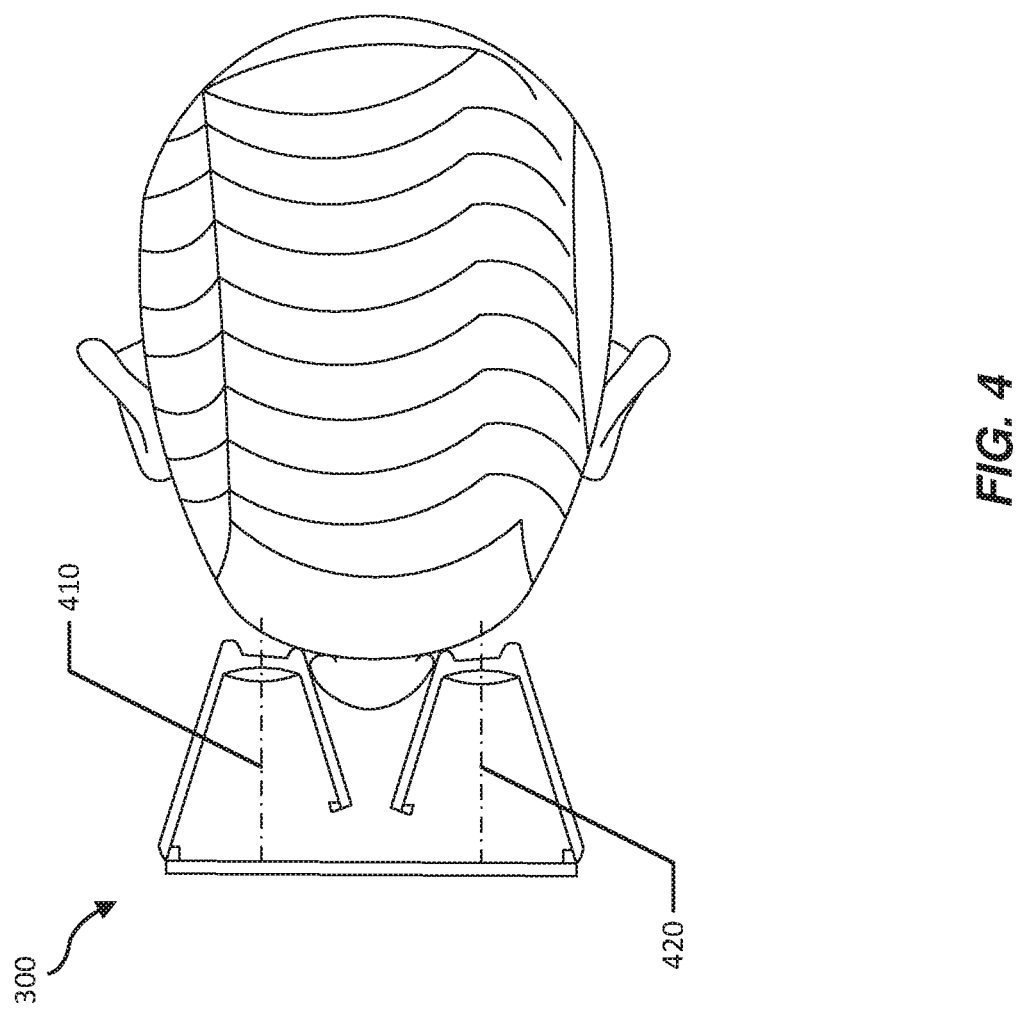
FIG. 4 is a top view of a flexible display apparatus fitted to a user with a given interpupillary distance.

FIG. 4 shows an example of display apparatus 300 as fitted to a user. As shown in FIG. 4, display screen area 322 may project a projection 410 to the user's right eye and display screen area 320 may project a projection 420 to the user's left eye. Because display 310 is not bent, display 310 may be effectively configured for an interpupillary distance substantially equal to the distance between the centers of display screen areas 320 and 322. As projections 410 and 420 intersect the viewing plane (the plane approximately parallel to the user's face and tangential to the user's eyes), the distance between projections 410 and 420 may represent a corresponding interpupillary distance.

Figure 5:
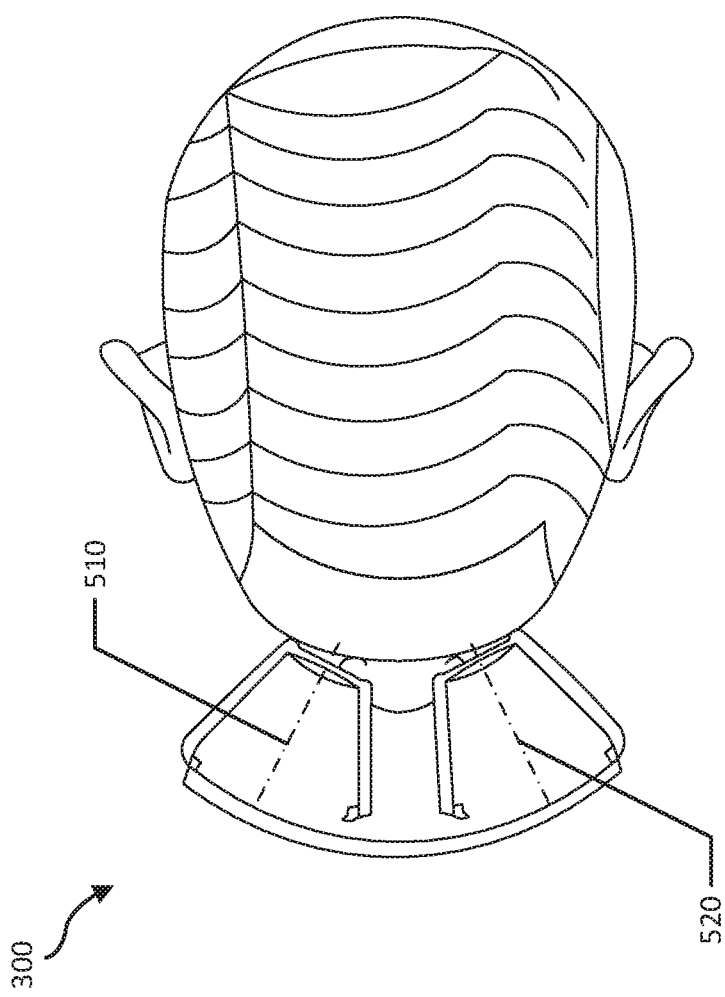
FIG. 5 is a top view of a flexible display apparatus fitted to a user with a narrower interpupillary distance.

FIG. 5 shows an example of display apparatus 300 in a different configuration than in FIG. 4. As shown in FIG. 5, display 310 may be bent toward the user's face, thereby angling display screen areas 320 and 322, eye cups 330 and 340, and lenses 332 and 342 inward. Thus, the distance between projections 510 and 520 as they intersect the viewing plane may be smaller than in the case of FIG. 4, representing a corresponding smaller interpupillary distance. Accordingly, the configuration of display 310 in FIG. 5 may be adapted for a user with close-set eyes.

Figure 6:
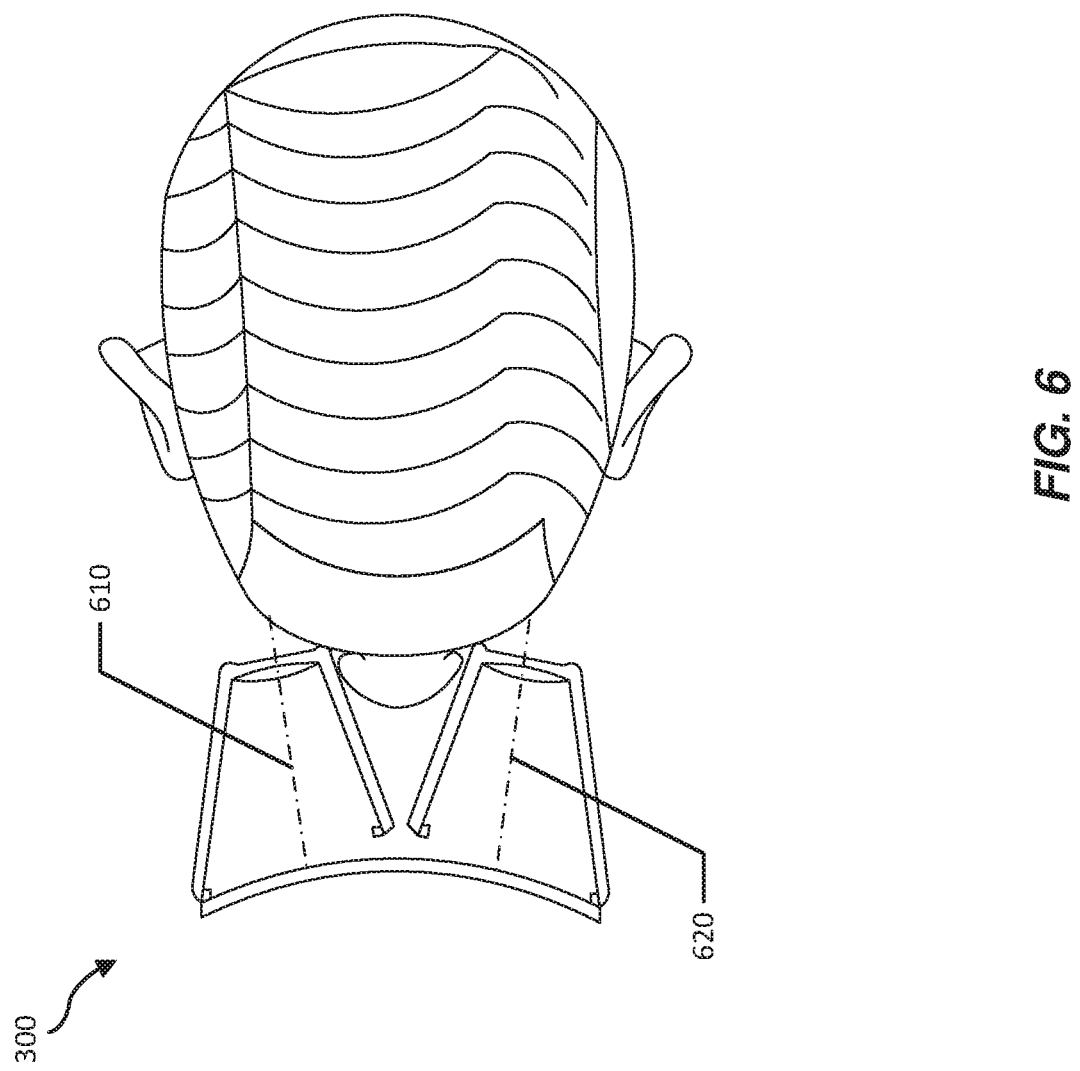
FIG. 6 is a top view of a flexible display apparatus fitted to a user with a wider interpupillary distance.

FIG. 6 shows an example of display apparatus 300 in a different configuration than in FIGS. 4 and 5. As shown in FIG. 6, display 310 may be bent away from the user's face, thereby angling display screen areas 320 and 322, eye cups 330 and 340, and lenses 332 and 342 outward. Thus, the distance between projections 610 and 620 as they intersect the viewing plane may be greater than in the case of FIGS. 4 and 5, representing a corresponding greater interpupillary distance. Accordingly, the configuration of display 310 in FIG. 6 may be adapted for a user with wide-set eyes. As may be appreciated by the illustration in FIG. 6, although the illustrated configuration of display apparatus 300 accommodates wider-set eyes than does the illustration configuration in FIG. 4, display apparatus 300 is no wider in the illustrated configuration of FIG. 6. Thus, display apparatus 300 may simultaneously accommodate wide-set eyes and a constrained form factor.

In some examples, display apparatus 300 shown in FIGS. 4-6 may be part of a head-mounted-display system. For example, a head-mounted-display system may include an adjustable display apparatus (such as one or more of the devices described above and/or illustrated in FIGS. 4-6) and a head mount. The head mount may be coupled to the adjustable display apparatus. When worn by a user, the head mount may hold the adjustable display apparatus to the user's face such that the left-eye display screen area projects to the user's left eye and the right-eye display screen area projects to the user's right eye. The head-mounted-display system may generally include any system for holding the display apparatus such that the display apparatus is wearable for a user (e.g., so that the user does not need to hold the display apparatus).

Figure 7:
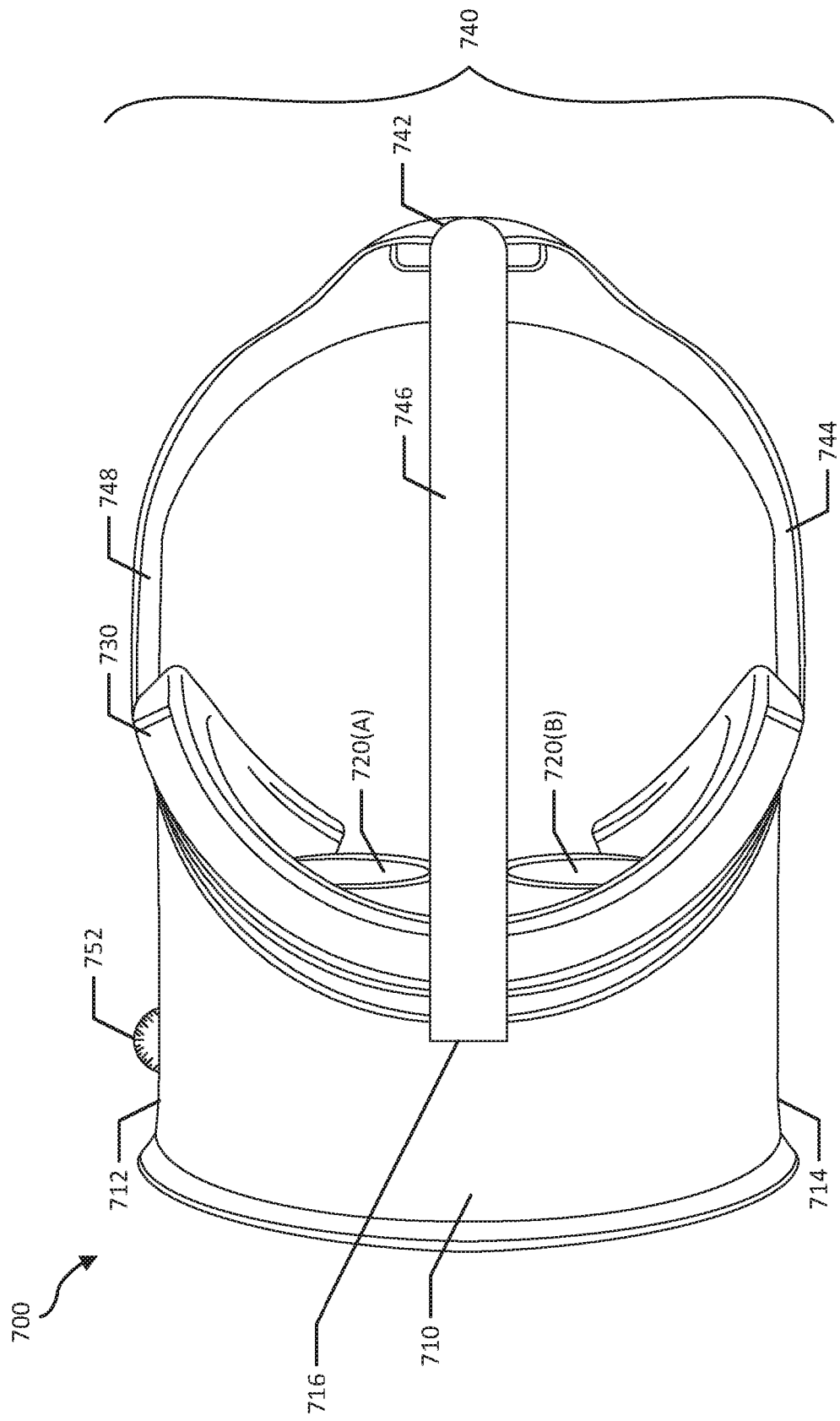
FIG. 7 is a top view of a head-mounted display system.

FIGS. 7-10 provide an example of a head-mounted-display system that includes an adjustable display apparatus and a head mount. FIG. 7 is a top view of a head-mounted-display system 700. As shown in FIG. 7, head-mounted display 710 may include eye pieces 720(A)-(B) (which may replace, augment, and/or correspond to eye cups 330 and 340 illustrated in FIG. 3) and a facial-interface system 730 (e.g., a cushion). Head-mounted display 710 may also be coupled to a strap system 740, which may include a back section 742 that forms a coupling point for a left-side section 744, a top section 746, and a right-side section 748. Left-side section 744 of strap system 740 may be coupled to a left side 714 of head-mounted-display system 700, right-side section 748 may be coupled to a right side 712 of head-mounted-display system 700, and top section 746 may be coupled to a top portion or area 716 of head-mounted display 710.

Furthermore, head-mounted-display system 700 may include a means for adjusting head-mounted display 710 (e.g., by bending a flexible display screen frame within head-mounted display 710). For example, head-mounted-display system 700 may include a dial 752 that, when rotated, may adjust the position and/or orientation of internal display screen areas and/or eye pieces 720(A)-(B). While dial 752 is illustrated on the right side of head-mounted display 710, a dial may be located in any suitable location (e.g., on the left side of head-mounted display 710, on top of head-mounted display 710, underneath head-mounted display 710, etc.). In some examples, head-mounted-display system 700 may include a pair of dials (e.g., one on the right side of head-mounted display 710 and one on the left side of head-mounted display 710), either of which may be used to adjust head-mounted display 710.

Figure 8:
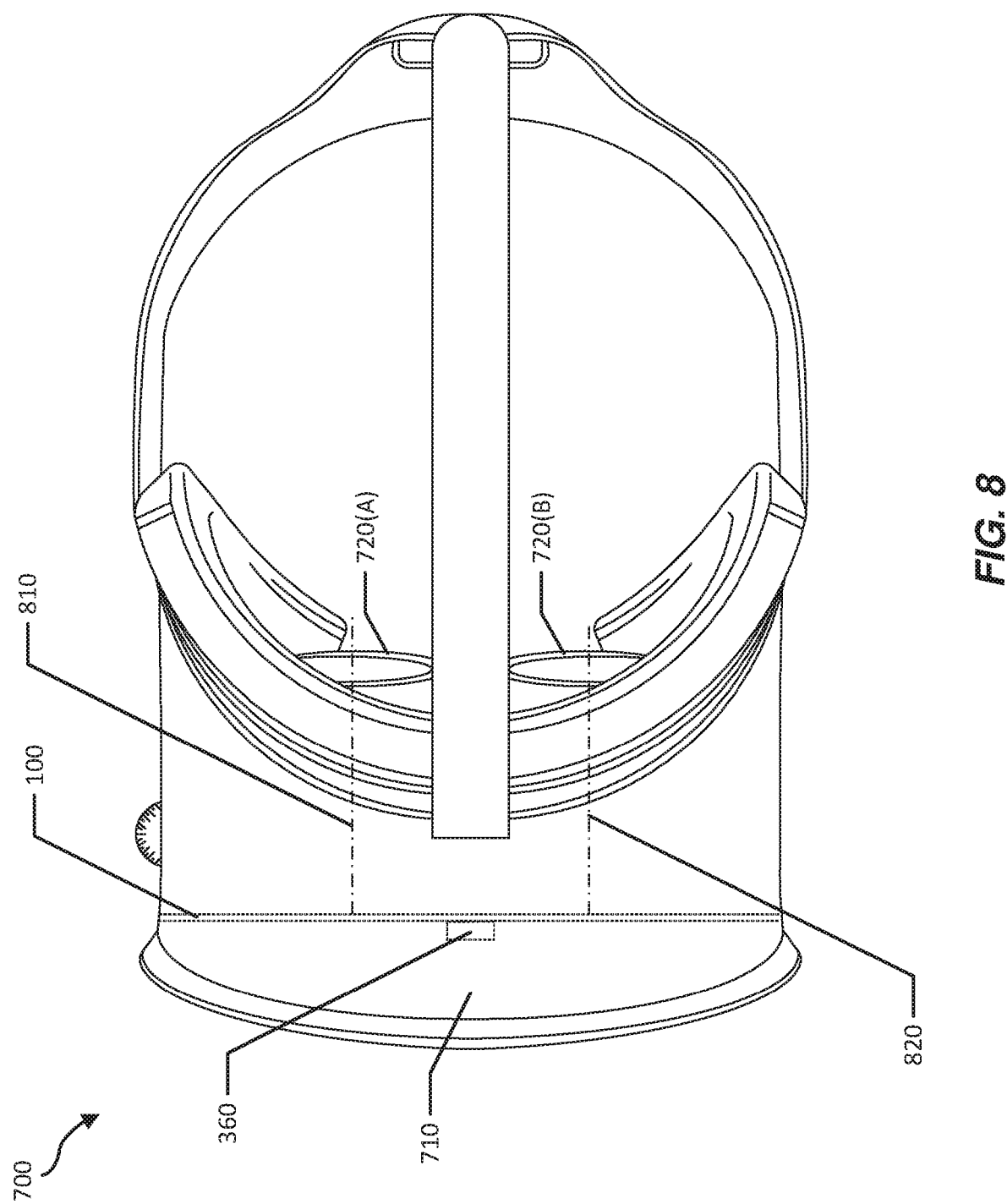
FIG. 8 is a top view of a head-mounted display system with a flexible display apparatus set for a given interpupillary distance.
Figure 9:
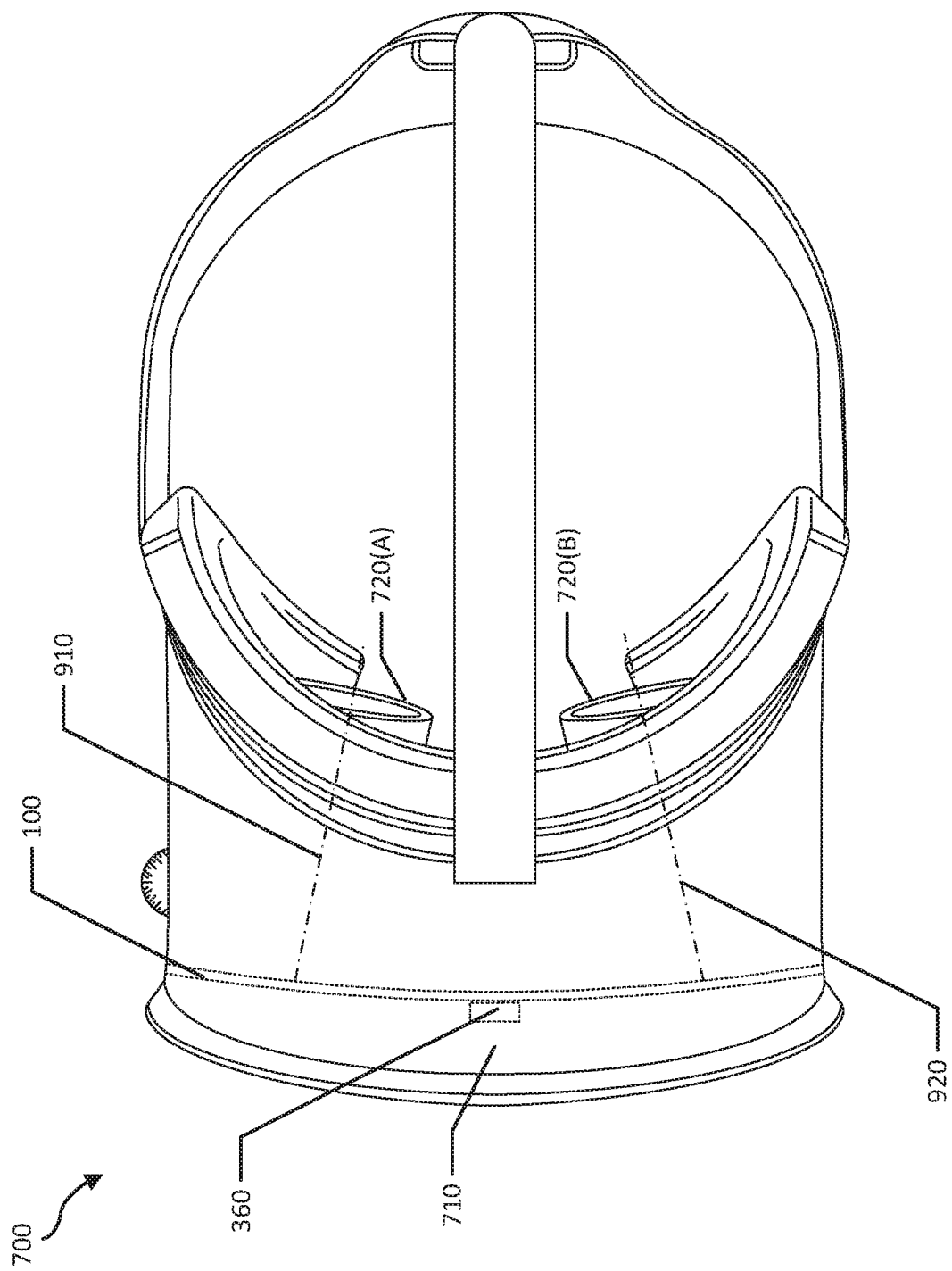
FIG. 9 is a top view of a head-mounted display system with a flexible display apparatus set for a narrower interpupillary distance.
Figure 10:
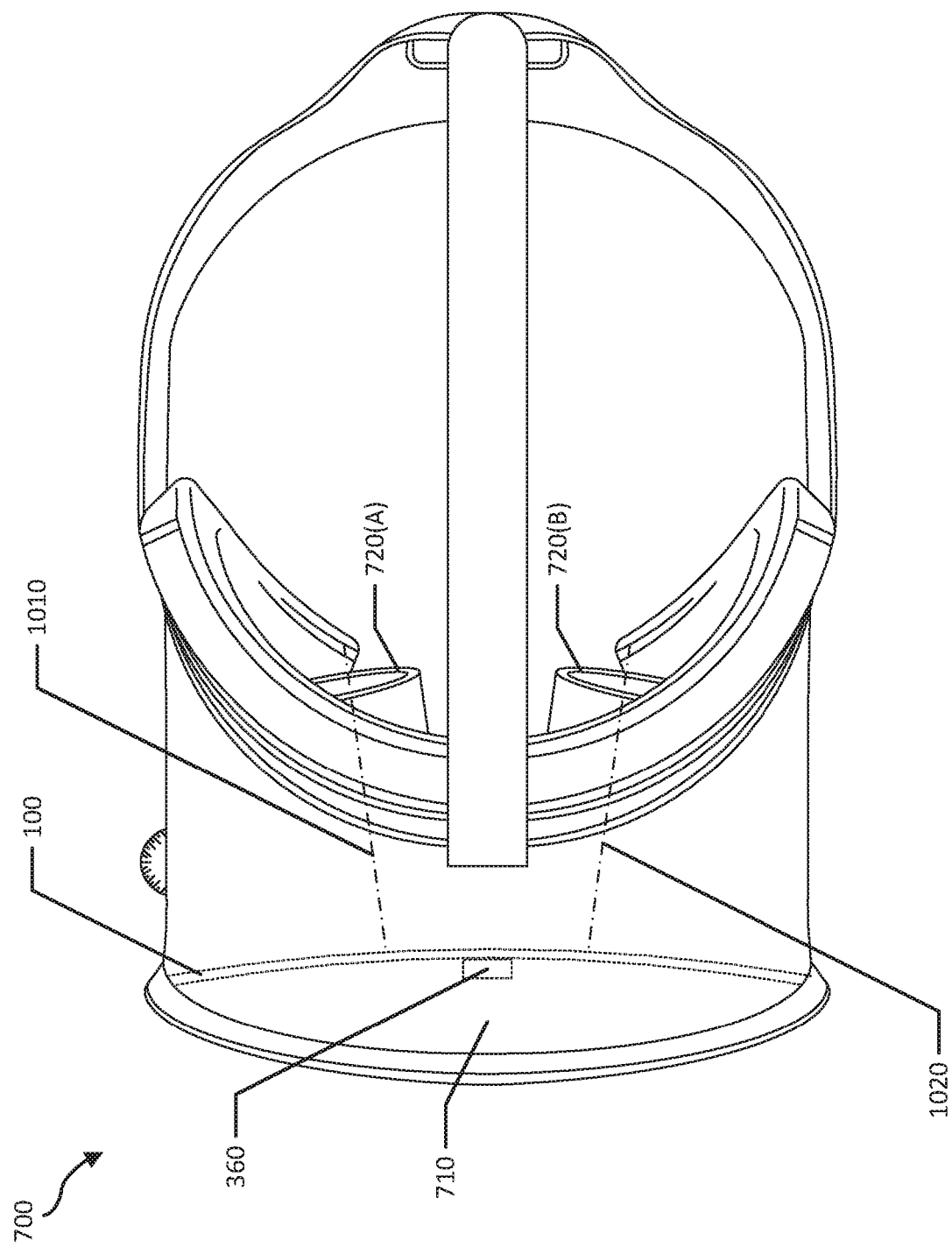
FIG. 10 is a top view of a head-mounted display system with a flexible display apparatus set for a wider interpupillary distance.

FIGS. 8-10 illustrate, by way of example, a flexible display apparatus in different configurations within head-mounted display system 700. For example, as shown in FIG. 8, display 100 may form a part of head-mounted display 710. For example, display 100 may be coupled to rigid holding element 360 which, in turn, may be coupled to an encasement of head-mounted display 710. As shown in FIG. 8, display 100 may be in a substantially neutral (i.e., unbent) state, projections 810 and 820 may be substantially parallel, and eye pieces 720(A)-(B) may in a substantially parallel orientation.

FIG. 9 shows head-mounted display system 700 in a different configuration state. For example, a user may have rotated dial 752 to bend display 100 toward the viewing plane. As shown in FIG. 9, rigid holding element 360 may stay in place, and the ends of display 100 may bend inward. Accordingly, projections 910 and 920 may be directed inward, resulting in a reduced distance between projections 910 and 920 as they reach the ends of eye pieces 720(A)-(B). Eye pieces 720(A)-(B) may also be angled inward (e.g., substantially aligning with projections 910 and 920). Thus, the configuration state in FIG. 9 may be more suitable for closer-set eyes than the configuration state in FIG. 8.

FIG. 10 shows head-mounted display system 700 in a different configuration state. For example, a user may have rotated dial 752 to bend display 100 away from the viewing plane. As shown in FIG. 10, rigid holding element 360 may stay in place, and the ends of display 100 may bend outward. Accordingly, projections 1010 and 1020 may be directed outward, resulting in an increased distance between projections 1010 and 1020 as they reach the ends of eye pieces 720(A)-(B). Eye pieces 720(A)-(B) may also be angled outward (e.g., substantially aligning with projections 1010 and 1020). Thus, the configuration state in FIG. 10 may be more suitable for wider-set eyes than the configuration states in FIGS. 8-9.

Although FIGS. 8-10 reference display 100 by way of example, it may be appreciated that display 100 may be substituted with display 200 or any other suitable flexible display. In addition, while FIGS. 7-10 illustrate dial 752 by way of example, the systems described herein may include any suitable actuator that controls a degree to which the flexible planar support frame bends. Where a dial is used, these systems may also include a translating element that translates rotation of the dial into linear movement of a bending element that is coupled to the flexible planar support frame and that bends the flexible planar support frame via linear movement. For example, the linear movement may be applied to the ends of the flexible planar support frame (e.g., push the ends of the flexible planar support frame away from the user's face and the viewing plane or to push the ends of the flexible planar support frame toward the user's face and the viewing plane). In some examples, the adjustment mechanism may include a geared mechanism that enables a user to adjust the deflection of the flexible display (and, thus, to adjust the effective interpupillary distance configuration of the head-mounted-display system) with a high degree of granularity.

Figure 11:
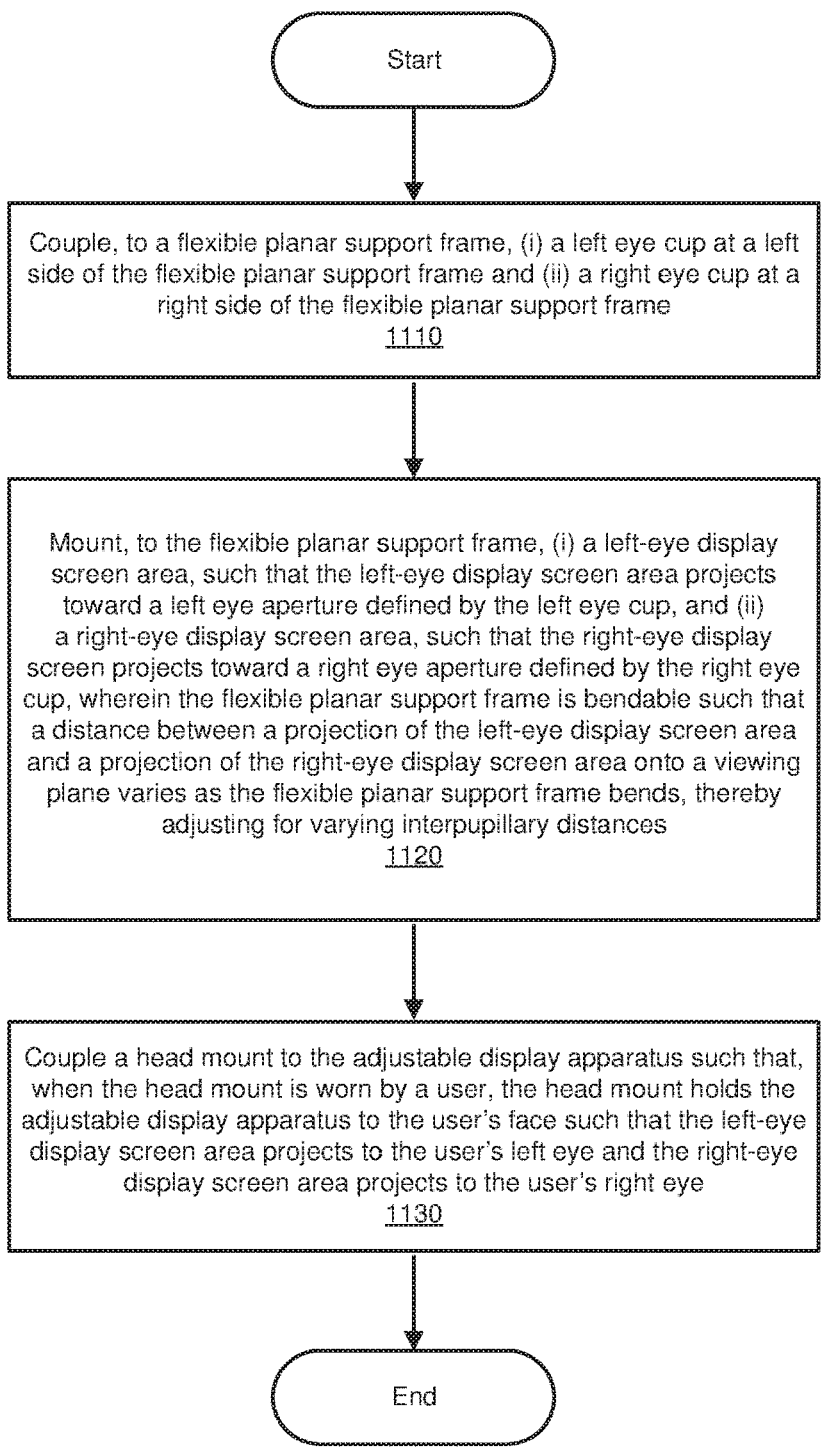
FIG. 11 is a flow diagram of a method for assembling a head-mounted display system with a flexible display apparatus.

FIG. 11 shows a flow diagram of an exemplary method 1100 for manufacturing, assembling, and/or configuring one or more of the systems and devices described herein. As shown in FIG. 11, at step 1110 a left eye cup may be coupled to a left side of a flexible planar support frame and a right eye cup may be coupled to a right side of a flexible planar support frame. For example, as shown in FIG. 3, eye cup 330 may be coupled to the left side of flexible display 310 (e.g., to the flexible planar support frame that forms a part of flexible display 310) with fastener 352 and eye cup 340 may be coupled to the right side of flexible display 310 with fastener 354. Thus, eye cups 330 and 340 may be secured to flexible display 310 such that eye cups 330 and 340 angle outward or inward as display areas 320 and 322 angle outward or inward.

At step 1120, a left-eye display screen area and a right-eye display screen area may be mounted to the flexible planar support frame. Taking FIG. 1 as an example, display screen 120 and display screen 122 may be mounted to flexible planar support frame 110. Taking FIG. 2 as an example, display screen areas 220 and 222 may both form a part of the integral display screen 212. Accordingly display screen areas 220 and 222 may be mounted to flexible planar support frame 210 by mounting display screen 212 to support frame 210. One or more display screens may be mounted to the flexible planar support frame in any suitable manner. For example, a display screen may be mounted to the flexible planar support frame with a flexible adhesive. Additionally or alternatively, a display screen may be mounted to the flexible planar support frame with a molding process to create a flexible frame that fits around the display screen.

The left- and right-eye display screen areas and the left and right eye cups may be mounted and coupled in positions such that the left-eye display screen area projects toward a left eye aperture defined by the left eye cup and the right-eye display screen area projects toward a right eye aperture defined by the right eye cup.

At step 1130, a head mount may be coupled to the adjustable display apparatus such that, when the head mount is worn by a user, the head mount holds the adjustable display apparatus to the user's face such that the left-eye display screen area projects to the user's left eye and the right-eye display screen area projects to the user's right eye. Taking FIG. 7 as an example, strap system 740 may be coupled to display 710 (which may house a flexible, adjustable display apparatus). Thus, strap system 740 may hold display 710 to a user's face and hold eye-pieces 720(A) and 720(B) up to the user's eyes.

While the adjustment mechanisms discussed above may correct for interpupillary distance, in some examples they also may introduce minor image distortions from the user's perspective. For example, the deflections of the display screen areas may introduce perspective effects that may cause portions of the images projected from the display screen areas to appear smaller and/or more distant and portions to appear larger and/or closer. In some examples, to correct for these minor image distortions the systems described herein may modify the images to account for the deflection of the display screen areas. For example, the head-mounted display system may include a sensor that detects an extent to which the flexible planar support frame is bent. The sensor may derive the information in any suitable manner. For example, the sensor may include a stress gauge coupled to the flexible planar support frame. The systems described herein may translate the measurement read from the stress gauge to a deflection metric. Additionally or alternatively, the sensor may detect and/or relay an adjustment setting (e.g., the sensor may relay the setting of a dial that adjusts the deflections of the flexible display). The sensor may transmit a signal that indicates the extent of deflection of the flexible planar support frame to a compensation module. The compensation module may be implemented in any suitable manner. For example, the compensation module may form a part of a graphics card, a graphics driver, and/or the flexible display. The compensation module may normalize images displayed by the flexible display such that when the images are projected from the deflected display to the user's eyes, the distortion is not apparent to the user.

As described above, a head-mounted display may include a flexible interpupillary distance adjustment structure. The interpupillary distance adjustment structure may angle virtual reality lenses (instead of, e.g., moving them along a track) to accommodate various user eye spacing. In one example, the adjustment structure may include two rigid substrate display panels coupled with a flexible material that enables the display panels, as well as corresponding eye cups and lenses, to be angled inward and/or outward to adjust lens spacing. In another example the adjustment structure may include a flexible substrate display panel that flexes inward and/or outward to adjust spacing of corresponding lenses. Various types of adjustment mechanisms, such as geared tuning mechanisms, may be coupled to the display panel to allow users to adjust lens spacing. Such interpupillary distance adjustment assemblies may provide improved fit for users, may involve fewer moving parts than potential alternative adjustment mechanisms, and may allow for head-mounted displays with smaller form factors.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
    a flexible planar support frame;
    a left eye cup coupled to a left side of the flexible planar support frame;
    a right eye cup coupled to a right side of the flexible planar support frame;
    a left-eye display screen area mounted to the flexible planar support frame such that the left-eye display screen area projects toward a left eye aperture defined by the left eye cup; and
    a right-eye display screen area mounted to the flexible planar support frame such that the right-eye display screen area projects toward a right eye aperture defined by the right eye cup; and
    wherein the flexible planar support frame is bendable along a vertical axis between the left-eye display screen area and the right-eye display screen area such that the left-eye display screen area and the right-eye display screen area deflect as the flexible planar support frame bends, altering an angle between a direction of a projection of the left-eye display screen area and a projection of the right-eye display screen area to cause a distance between the projection of the left-eye display screen area and the projection of the right-eye display screen area onto a viewing plane to vary as the flexible planar support frame bends, thereby adjusting for varying interpupillary distances.

2. The apparatus of claim 1, wherein the flexible planar support frame is bendable toward a user's face such that the distance between the projection of the left-eye display screen area and the projection of the right-eye display screen area decreases, thereby adjusting for a reduced interpupillary distance.

3. The apparatus of claim 1, wherein the flexible planar support frame is bendable away from a user's face such that the distance between the projection of the left-eye display screen area and the projection of the right-eye display screen area increases, thereby adjusting for an increased interpupillary distance.

4. The apparatus of claim 1, wherein the left-eye display screen area and the right-eye display screen area comprise separate display screens that angle toward each other as the flexible planar support frame bends toward a user's face and that angle away from each other as the flexible planar support frame bends away from the user's face.

5. The apparatus of claim 1, wherein the left-eye display screen area and the right-eye display screen area comprise areas of an integral display screen, the integral display screen comprising a flexible display material, allowing the integral display screen to bend as the flexible planar support frame bends.

6. The apparatus of claim 1, further comprising an actuator that controls a degree to which the flexible planar support frame bends.

7. The apparatus of claim 6, wherein the actuator comprises:
    a dial; and
    a translating element that translates rotation of the dial into linear movement of a bending element that is coupled to the flexible planar support frame and that bends the flexible planar support frame via linear movement.

8. The apparatus of claim 1, further comprising a rigid holding element, coupled to the flexible planar support frame at a center position between the left-eye display screen area and the right-eye display screen area, around which the flexible planar support frame bends.

9. The apparatus of claim 1, further comprising a pair of lenses coupled to the left eye cup and the right eye cup.

10. The apparatus of claim 1, further comprising a sensor that detects and transmits a signal describing an extent to which the flexible planar support frame is bent to a compensation module, wherein the compensation module adjusts images displayed by the left-eye display screen area and the right-eye display screen area based at least in part on the signal to normalize a projection of the images to a user's eyes to correct for apparent distortion caused by moving the left-eye display screen area and right-eye display screen area relative to the user's eyes.

11. A system comprising:
an adjustable display apparatus comprising:
a flexible planar support frame;
a left eye cup coupled to a left side of the flexible planar support frame;
a right eye cup coupled to a right side of the flexible planar support frame;
a left-eye display screen area mounted to the flexible planar support frame such that the left-eye display screen area projects toward a left eye aperture defined by the left eye cup; and
a right-eye display screen area mounted to the flexible planar support frame such that the right-eye display screen area projects toward a right eye aperture defined by the right eye cup;
wherein the flexible planar support frame is bendable along a vertical axis between the left-eye display screen area and the right-eye display screen area such that the left-eye display screen area and the right-eye display screen area deflect as the flexible planar support frame bends, altering an angle between a direction of a projection of the left-eye display screen area and a projection of the right-eye display screen area to cause a distance between the projection of the left-eye display screen area and the projection of the right-eye display screen area onto a viewing plane to vary as the flexible planar support frame bends, thereby adjusting for varying interpupillary distances; and
a head mount coupled to the adjustable display apparatus that, when worn by a user, holds the adjustable display apparatus to the user's face such that the left-eye display screen area projects to the user's left eye and the right-eye display screen area projects to the user's right eye.

12. The system of claim 11, wherein the flexible planar support frame is bendable toward a user's face such that the distance between the projection of the left-eye display screen area and the projection of the right-eye display screen area decreases, thereby adjusting for a reduced interpupillary distance.

13. The system of claim 11, wherein the flexible planar support frame is bendable away from a user's face such that the distance between the projection of the left-eye display screen area and the projection of the right-eye display screen area increases, thereby adjusting for an increased interpupillary distance.

14. The system of claim 11, wherein the left-eye display screen area and the right-eye display screen area comprise separate display screens that angle toward each other as the flexible planar support frame bends toward a user's face and that angle away from each other as the flexible planar support frame bends away from the user's face.

15. The system of claim 11, wherein the left-eye display screen area and the right-eye display screen area comprise areas of an integral display screen, the integral display screen comprising a flexible display material, allowing the integral display screen to bend as the flexible planar support frame bends.

16. The system of claim 11, further comprising an actuator that controls a degree to which the flexible planar support frame bends.

17. The system of claim 16, wherein the actuator comprises:
a dial; and
a translating element that translates rotation of the dial into linear movement of a bending element that is coupled to the flexible planar support frame and that bends the flexible planar support frame via linear movement.

18. The system of claim 11, further comprising a rigid holding element that is:
coupled to the flexible planar support frame at a center position between the left-eye display screen area and the right-eye display screen area, around which the flexible planar support frame bends; and
coupled to the head mount, thereby indirectly coupling the flexible planar support frame to the head mount.

19. A method comprising:
coupling, to a flexible planar support frame:
a left eye cup at a left side of the flexible planar support frame; and
a right eye cup at a right side of the flexible planar support frame; and
mounting, to the flexible planar support frame:
a left-eye display screen area, such that the left-eye display screen area projects toward a left eye aperture defined by the left eye cup; and
a right-eye display screen area, such that the right-eye display screen area projects toward a right eye aperture defined by the right eye cup; and
wherein the flexible planar support frame is bendable along a vertical axis between the left-eye display screen area and the right-eye display screen area such that the left-eye display screen area and the right-eye display screen area deflect as the flexible planar support frame bends, altering an angle between a direction of a projection of the left-eye display screen area and a projection of the right-eye display screen area to cause a distance between the projection of the left-eye display screen area and the projection of the right-eye display screen area onto a viewing plane to vary as the flexible planar support frame bends, thereby adjusting for varying interpupillary distances.

20. The method of claim 19, comprising coupling a head mount to an adjustable display apparatus such that, when the head mount is worn by a user, the head mount holds the adjustable display apparatus to the user's face such that the left-eye display screen area projects to the user's left eye and the right-eye display screen area projects to the user's right eye.

* * * * *